July 13, 1937.   E. R. BURTNETT   2,086,600
TRI-VARIABLE AUTOMATIC CHANGE SPEED TRANSMISSION
Filed Nov. 4, 1933   3 Sheets-Sheet 2

INVENTOR.
Everett R. Burtnett

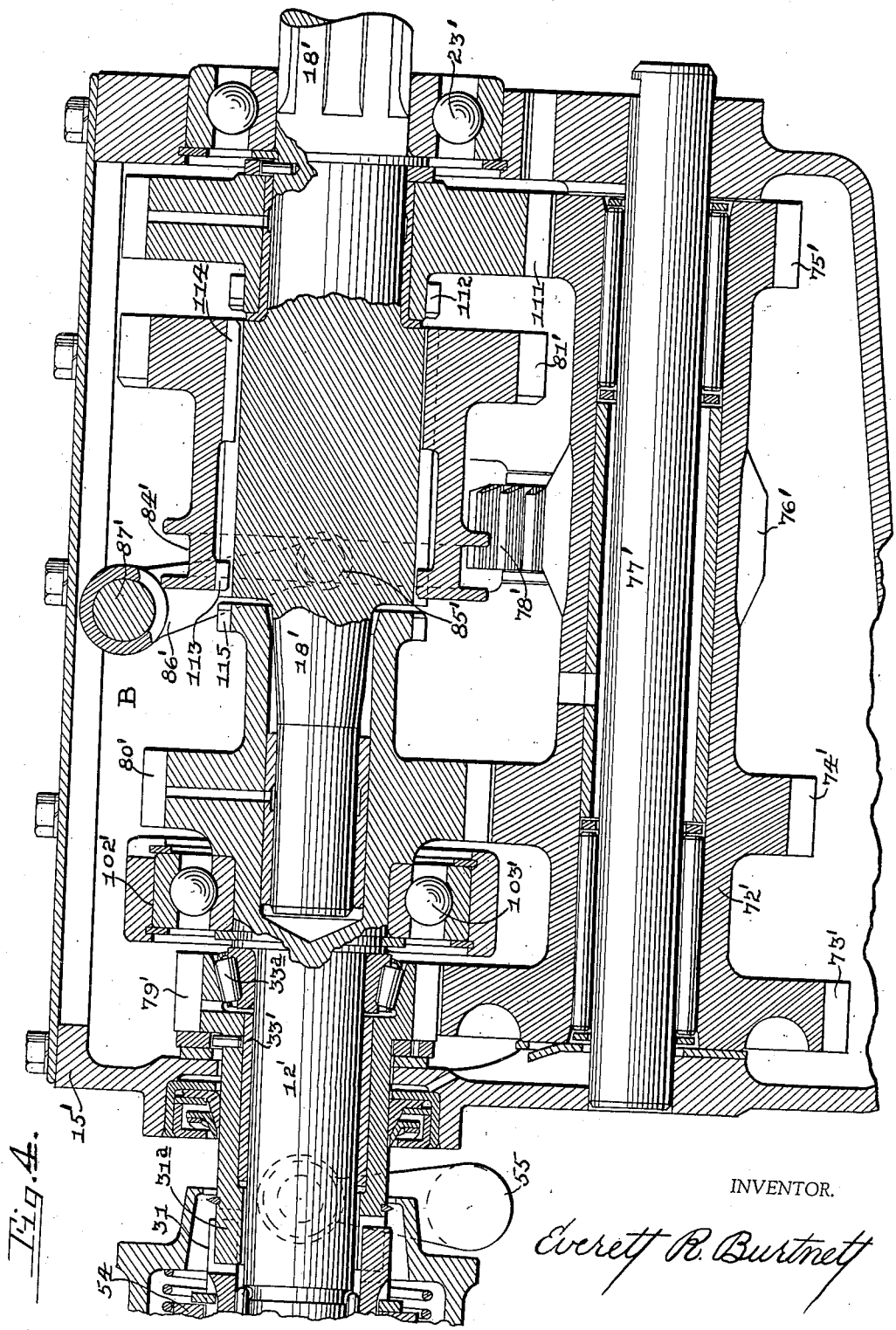

Patented July 13, 1937

2,086,600

UNITED STATES PATENT OFFICE 2,086,600

TRI-VARIABLE AUTOMATIC CHANGE SPEED TRANSMISSION

Everett R. Burtnett, Los Angeles, Calif., assignor, by mesne assignments, to Automotive Improvement Patents Corporation, Los Angeles, Calif., a corporation of California Application November 4, 1933, Serial No. 696,682

23 Claims. (Cl. 74—337)

This invention relates to a power transmission for general adaptation, but herein more particularly designed for use in connection with a motor vehicle.

An object of the invention is to provide a simplified, light weight and inexpensive form of change speed gearing affording at least three forward speed driving ratios by one constant meshing relation of gears and provided with dual input members and dual output members, the dual input members adapted to be input alternatively utilized in operating connection with a common power member whereby the gearing is altered in operating relation to give different driving ratios to either of the dual output members, and the output members adapted to give gear changing operation with a common vehicle propelling member.

Another object is to provide a simplified, highly efficient and inexpensive form of combined one-way driving low speed and two-way driving high speed connection establishing clutch embodiment interposed between the dual output members of the change speed gearing unit and the vehicle propelling shaft whereby, in a preselected forward driving relation, the gearing unit is established in permanent one-way driving relation by its low speed effected output member with the vehicle propelling shaft, and whereby on sufficient speed of rotation of one of the gearing and vehicle propelling shaft members the gearing is automatically brought into high speed output member operating connection with the vehicle propelling shaft, while maintaining the low speed output member operating connection therewith.

Another object is to provide a simplified, flexible, highly efficient and inexpensive form of double acting clutch embodiment interposed between the dual input members of the change speed gearing unit and the transmission member which is driven by the vehicle engine for selectively completing the driving connection between the engine driven transmission member and one of the two input members of the gearing unit, whereby the latter is effected to give different driving ratios by each of the dual output members thereof by alternative operation of this input controlling double acting clutch.

Another object is to adapt one of the two separate clutching elements of the double acting input controlling clutch to operate on sufficient speed of rotation of the engine driven transmission member to automatically complete the driving connection between the relatively higher speed driving ratio effecting one of the two gearing input members and the engine driven transmission member, and to automatically disengage and free the engine on the latter decelerating to a predetermined low (idling) speed; and in connection with the speed controlled operation of one of the separate clutching elements of the double acting input clutch to give the high driving ratio operating relation between the gearing and the engine driven transmission member, to adapt the alternative separate clutching element of this input clutch component of the invention to optional operator control for supplanting the normally automatic operating high driving ratio gearing input driving connection with the low driving ratio gearing input driving connection.

As another object, and more particularly in connection with the two-speed dual input clutch feature, the invention aims to provide novel means for effecting disengagement of the automatically engaged one of the two-speed effecting clutch elements of the input control whereby, in response to a force caused to be conveyed through the body of the other, alternative or manual engagement effectually controlled clutch element of said dual input clutch feature, the automatic engaged clutch will be disengaged in favor of the substituted speed, or gear ratio as effected by the manually engaged clutch. The object being to simultaneously effect disengagement of one clutch and engagement of another, or substitute driving ratio effecting clutch by a physical force requirement on the operator no greater than that required to engage the option alternative driving ratio effecting clutch, and the principle of this means being that of accomplishing disengagement of a normally automatically engaged clutch in response, or as a result of engagement of, a second and option effectually engageable clutch.

The invention also provides operator option to change from either the engine speed controlled or vehicle speed controlled centrifugal clutch normally established driving ratio, at any speed of the vehicle, and with all the dentate related transmission members maintained in the preselected forward drive constant operating relation, by depressing the single forward speed control treadle with the toe of the left (conventional clutch) foot, while maintaining the right foot in control of the accelerator pedal, thus affording both hands may be free to manipulate the steering wheel. This novel and extremely advantageous feature of the present invention is rendered doubly advantageous and affords an unprecedented safety factor in the operation of a motor vehicle, in that it permits of the optional driving speed ratios being of two-way driving in character and the period of the supplanted drive facilitated to overlap the drive of the supplanting driving speed ratio, thus availing engine compression as a brake in either and giving uninterrupted vehicle propelling torque flow while the change of speed or driving ratio is being effected. Of particular importance of this novel feature is the means for meeting emergencies such as instantly adjusting the transmission from a state giving direct drive to a state giving an engine-compression-utilizing gear drive for negotiating slippery down grades or for accelerating the vehicle, at comparatively low speeds, from the path of approaching danger.

A still further object of the invention is to provide a combined centrifugal automatic drive coupling and centrifugal automatic change speed motor vehicle transmission having a power driven main-line drive shaft member and a vehicle propelling main-line driven shaft member; incorporating a variable speed gearset intermediary therebetween which includes both a direct drive connecting main-line intermediary shaft normally in broken relation with both said drive and driven main-line shafts and which variable speed intermediary also includes an indirect gear drive actuated by the main-line direct drive connecting intermediary shaft and normally in operating connection to one-way drive the main-line driven shaft and permitting over-running by the latter; and in connection with such a combination of normally broken driving connections to provide a combination of two independently automatic drive coupling establishing units, one to open and close the break between the engine driven main-line drive and intermediary main-line shafts in accordance with the speed of the drive shaft and the other to open and close the break between the intermediate main-line and vehicle propelling main-line driven shafts in accordance with the speed of the driven shaft. Besides affording automatic uncoupling the recoupling of the engine, respectively, upon braking the vehicle down to a stop and upon accelerating the engine to start the vehicle in reduced gear and automatic change of speed ratio upon predetermined vehicle speed attainments, this combination, form and arrangement lends favorably to utilization of the conventional and inexpensive type of gear box having a fixed layshaft for torque multiplication gearing mounting.

Other objects and advantages will be obvious upon reading of the following description and on examination of the accompanying drawings.

In the drawings:

Figure 4 is a vertical longitudinal section through a modified form of variable speed gearing, particularly adaptable for use in connection with the double acting input clutch component of the present invention, wherein an adaptation is desired to provide only two speeds automatic.

Reference to these views will now be made with the use of like characters which are employed to designate corresponding parts throughout, but modified with respect to the modified form of the invention shown in Figure 4. The various unit embodiments making up the transmission are designated as A indicating the double acting input clutch to the change speed gearing indicated by B, the combined one-way and two-way driving clutch output unit from the change speed gearing indicated by C, and the system of instrumentalities forming the automatic power input clutch actuating component indicated by D.

Figure 1:
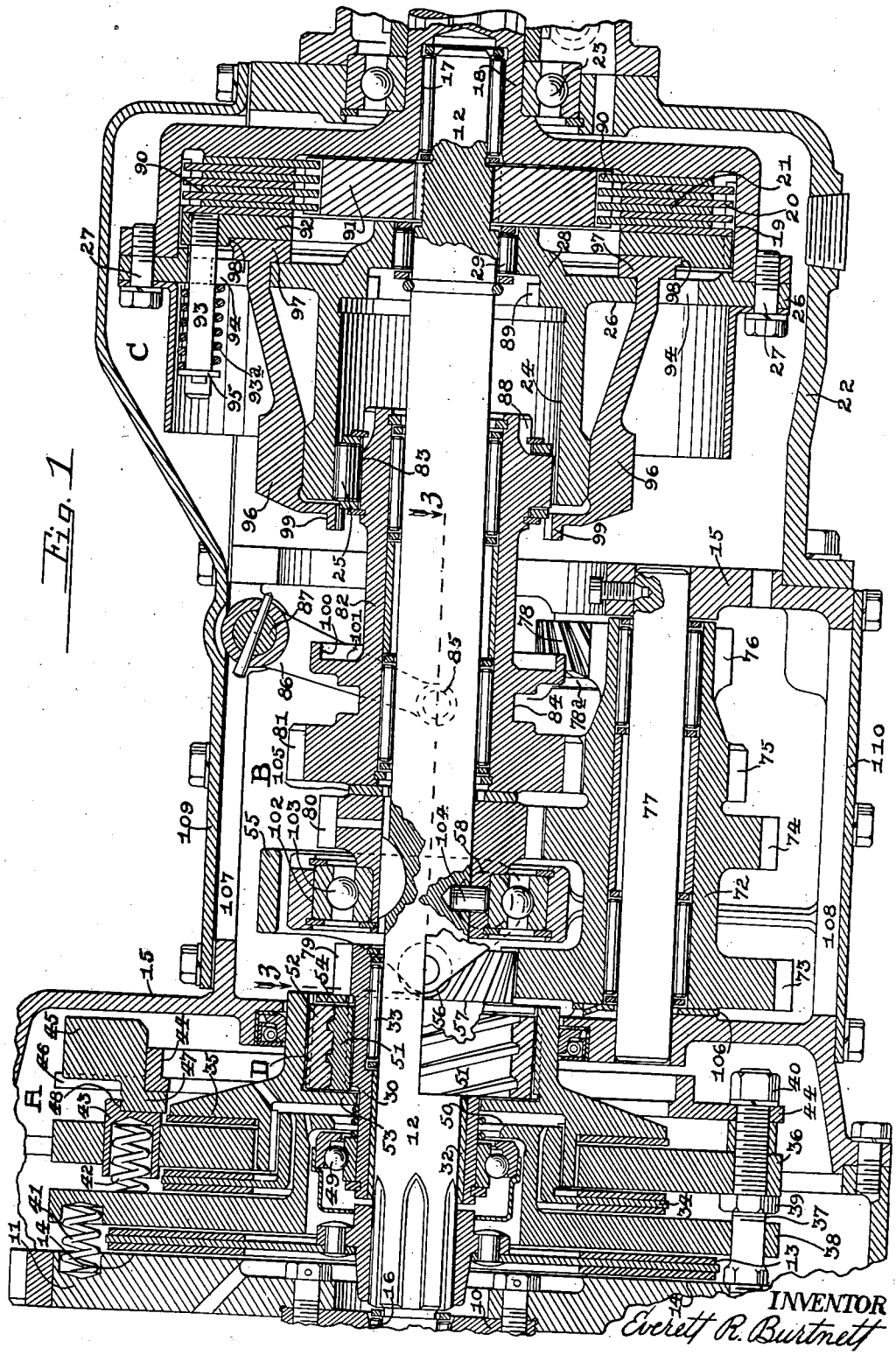
Figure 1 is a vertical longitudinal section through the entire transmission.
Figure 2:
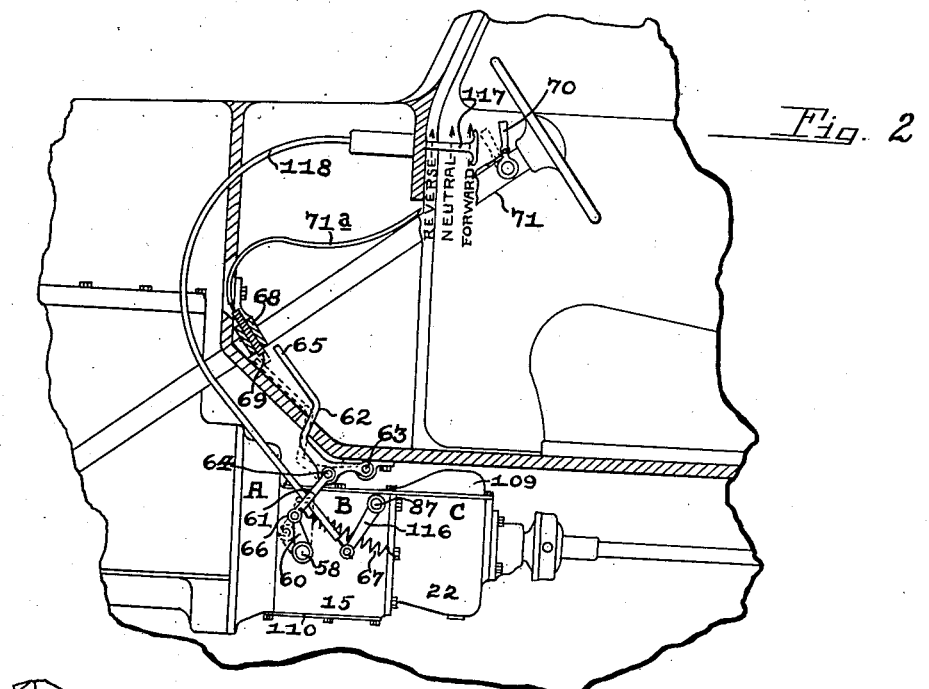
Figure 2 is an elevation of the operator control mechanism, in position resulting in forward drive.
Figure 3:
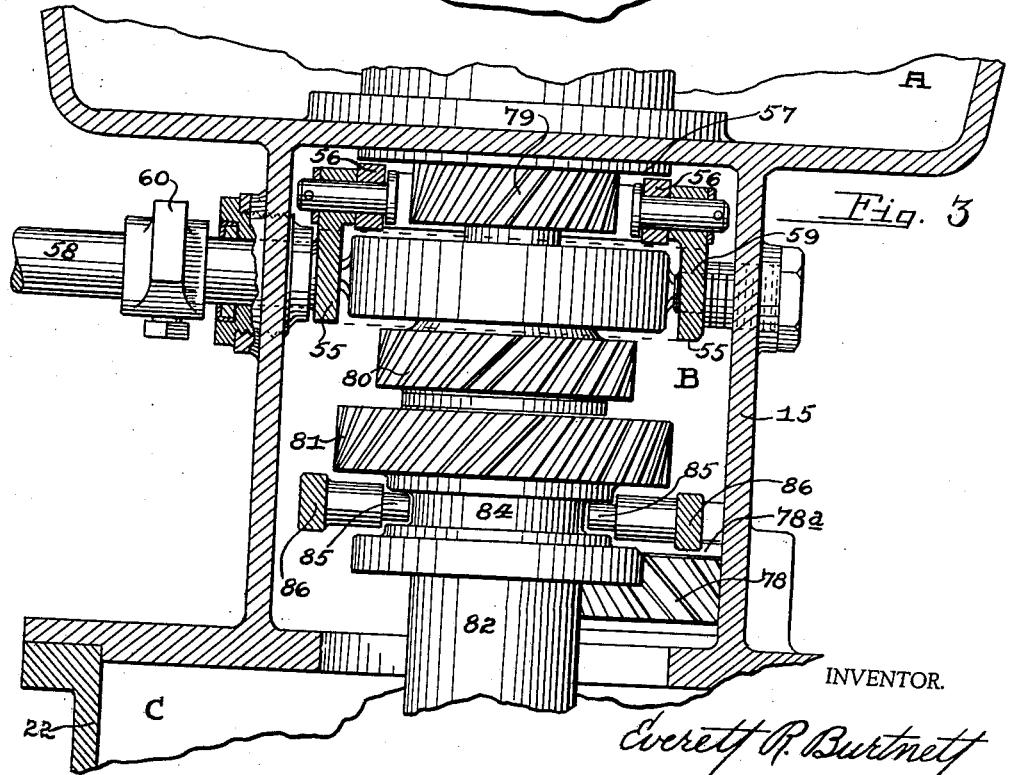
Figure 3 is a transverse sectional detail view taken on line 3—3 of Fig. 1, looking in the direction indicated by the arrows.

Referring to the views, and for the present, particularly to Figures 1, 2 and 3, the rear end of the engine shaft, which will be termed the engine driven transmission member or driving shaft, is indicated at 10. The customary engine flywheel carried in rotation with the engine shaft 10 is indicated at 11. An axially aligned shaft, which will be termed an intermediate shaft or first input member, is indicated at 12 and extends, preferably as an integral member through the change speed gearing unit B. A driven clutch plate 13 is carried in rotation with the shaft 12 and is adapted to be engaged with a bottom friction face 14 formed on the flywheel 11.

A case 15 provides a housing for the input clutch and change speed gearing components A and B. Piloting the driven end of the intermediate shaft 12 in journal engagement with the engine shaft 10 is a recess 16 formed in the latter, and piloting the driving end of the intermediate shaft 12 in an end recessed at 17 therefor is a vehicle propelling shaft 18, which latter may be termed the aligned driven member or driven shaft.

A bell 19 is provided and carried in rotation with the driven shaft 18, and a multiple disk friction element for completing a direct driving connection between the intermediate shaft 12 and driven shaft 18 is comprised of driven disks 20 keyed to the bell 19 of the driven shaft 18 and mating driving disks 21 keyed, preferably through the medium of an intermediary member, to the intermediate shaft 12.

A sub case 22, preferably detachably secured to the case 15, provides a housing for the output clutch component C of the invention, and a bearing 23 mounted in the end of this sub case journals the driven shaft 18 at a rear point therein.

A second bell 24 is provided and is preferably detachably secured to the open end of the first bell 19 whereby it is carried in rotation with the driven shaft 18. This second bell is preferably of smaller diameter than the bell 19 adapting the smaller diameter, which rotates with the driven shaft 18, to operate as a concentric driven race for roller clutch members 25, which latter in turn are adapted to engage one-way clutch cams. The bell 24 is formed with a flange portion 26 bolted at 27 to the bell 19. The smaller diameter bell 24 is also provided with a contracted rearward end 28 accommodating bearing rollers 29 by which latter the driven shaft 18 is mounted rotatable on the intermediate shaft 12.

Returning to the input end of the gearing component B and considering the intermediate shaft 12 as being adapted to operate as the high speed effecting input member to said gearing component, a tubular-shaped shaft 30 is sleeved rotatable on the intermediate shaft 12 and is adapted to operate as the second or low speed effecting input member to the change speed gearing B.

The separate driven clutch element for the second input shaft member 30 is provided in two parts comprising a driven friction plate 34 and a presser friction plate 35 respectively arranged in front and behind a back plate 36 which is fixed by rails 37 to the flywheel 11. The presser plate 35 is adapted to operate as an optional clutching presser member under control of the operator. A primary presser plate 38 is provided and disposed between the high speed input driven clutch plate 13 and the low speed driven plate 34 whereof it is supported by the rails 37 to rotate with the flywheel 11 and adapted to be moved forwardly into engagement with and to clutch the high speed driven plate 13 to the bottom friction face 14 and to be moved rearwardly into engagement with and to clutch the low speed driven plate 34 to the front face of the back plate 36. The back plate 36 is longitudinally held rigidly in an adjustable position by nuts 39 and 40 threaded onto the rails 37.

Springs 41 and 42 respectively placed between the primary presser plate 38 and the flywheel 11 and between the presser plate 38 and cups 43 operate to normally yieldingly maintain this presser plate in a neutral position between the high and low speed effective driven plates 13 and 34. The cups 43 are mounted longitudinally reciprocal on the back plate 36. A shell 44 is secured to the rails 37 by the nuts 40, and centrifugal weights 45 are operatively interposed between the cups 43 and the shell 44. The normal compression of the springs 41 and 42 is such as to normally maintain the weights 45 in positions at rest. Openings 46 are shown in the outer portion of the shell 44 to accommodate the weights 45 occupying the plane of said shell and serve as side guides therefor, while the feet 47 of the weights 45 seating in the offsets 48 of the cups 43 secure the weights 45 operatively in position.

An axial thrust bearing 49 is mounted on the low speed effecting input shaft 30 and adapted to be carried in axial movement rearwardly therewith. This thrust bearing is adapted to engage the inner flange portion 50 of the primary presser plate 38 on the bearing 49 being carried rearwardly with the shaft 30. A screw 51 is splined to the shaft 30 and is provided with a coacting nut 52 which latter is internally splined to the optional or auxiliary presser plate 35. This second presser plate 35 is formed with a flange 53 operatively in abutment with both the screw and nut members 51 and 52 for receiving axial movement urge from either, in a forwardly direction, and the shaft 30 is provided with a washer 54 keyed thereto and in operative abutment to both the screw and nut members 51 and 52 for transmitting axial movement urge from either, to the shaft 30. In the event of either the presser plate 35 or the shaft 30 being urged to rotate relative to each other, it will be obvious that the natural reaction between the screw and nut members 51 and 52 will be to move axially in opposite directions.

As a means for effecting initial engagement of the optional presser plate 35 with the back plate 36 a yoke 55 having roller members 56 on either side thereof and in juxtaposition with the rear face 57 of the hub portion of the optional presser plate 35 is provided. The yoke 55 is mounted for rocking motion by shaft portions 58 and 59 thereof in the case 15. Movement of this yoke so as to cause the rollers 56 to urge the presser plate 35 forwardly will result in the latter being brought into engagement with the back plate 36.

With reference now to Figures 2 and 3, a crank 60 is shown in connection with the shaft 58, and by means of a link 61 the crank 60 is operatively connected to a foot treadle 62 protruding through the toe board of the driver's compartment. Preferably the treadle 62 is mounted for rocking movement at 63 to the underside of the floor board of the vehicle, and the rocking axis 63 is rearwardly positioned with respect to the pin 64 connecting the treadle 62 to the link 61 whereby the linkage thus constructed between the pin 66 connecting the link 61 to the crank 60 and the rocking axis 63 of the treadle 62 will be moved into a dead center toggle state in response to the manual energizing of the treadle 62 at the toe end 65 thereof. This arrangement is proposed in order to obtain a high degree of force multiplication for the actuation of the yoke 55, rendering the manual effort requirement slightly more than the weight of the operator's foot on the end 65 of the treadle 62. A spring 67 is provided to return the linkage and treadle 62 to a neutral position.

To facilitate locking the foot treadle control in a position effective in maintaining the presser plate 35 in engagement with the back plate 36 for locking the input clutch in low driving ratio engagement for parking the vehicle in gear on hills or for permanently rendering the centrifugal automatic high driving ratio input clutch element inoperative, a secured bearing 68 is provided receiving a pin 69 reciprocal therein for movement into and out of a position in which the end 65 of the control treadle 62 will be latched in its depressed position. To actuate the pin 69, a small hand shift lever 70 is mounted for rocking motion preferably on the steering post 71 and this hand control 70 is operatively connected to the pin 69 by a wire 71ª.

Referring now to Fig. 1, the change speed gearing component B is illustrated as comprising a countershaft 72 made up of a gear cluster consisting of a driven gear 73, an intermediate gear 74, a low forward speed pinion 75 and a reverse drive pinion 76. The usual bar 77 provides the customary spindle with its ends fixed in the ends of the case 15 for the rotatable mounting of the countershaft 72.

A reverse idler gear 78 is disposed out of line but parallel to the reverse drive pinion 76 and in constant mesh therewith. A drive gear 79 is fixed to the second input shaft 30 and in constant mesh with the countershaft gear 73. An intermediate speed effecting gear 80 is fixed to the intermediate or first input shaft 12 and in constant mesh with the countershaft gear 74. A forward and reverse drive selector gear 81 having a rearwardly extending hub 82 provided with cams 83 engaging the roller clutch members 25 and carrying the latter axially and rotatably with it is mounted rotatable and axially shiftable on the intermediate shaft 12 for forward movement into mesh with the forward drive countershaft pinion 75 and for rearward movement into mesh with the reverse idler gear 78. The cams 83, rollers 25 and bell 24 in reality form an automatic clutch operatively between the driven gear 81 and the driven shaft 18 and which clutch is adapted to be controlled by the speed of the driven shaft 18 relatively to that of the gear 81.

The shiftable gear 81 is provided with a groove 84 adapted to receive the pin ends 85 of the yoke 86, which latter is mounted by a pin 87 for rocking motion in the case 15. To permit the roller clutch members 25 being carried axially with the shiftable gear 81, the bell 24 is formed of substantially thrice the length of the roller clutch members. Clutch jaws 88 are formed on the end of the hub portion of the gear 81 for engagement with jaws 89 formed in the bottom of the bell 24 when the gear 81 is shifted into mesh with the reverse idler gear 78 whereby the gear 81 is locked to the driven shaft 18 to effect reverse drive thereof.

Referring now to the output clutch component C, the high speed output centrifugal automatic clutch element thereof consists of a hub 91 serving as an intermediary connecting the driving clutch disks 21 thereof to rotate with the intermediate shaft 12. A presser plate 92 is splined to the bell 19 and disposed between the assembly of clutch disks 20 and 21 and the flange 26 and wherein by means of bolts 93 surrounded by springs 93a and projecting through openings 94 in the flange 26, and by compression of the springs 93a between the flange 26 and spring abutments 95, the spring energized bolts 93 tend to normally yieldingly urge the presser plate 92 into a forward position in which the disks 20 are maintained in released relation to the disks 21. Centrifugal weights 96 are provided to actuate the presser plate 92 and have feet 97 seating in an offset 98 formed in the forward face of the presser plate 92 and operatively interposed between the latter and the flange 26, wherein on sufficient speed of rotation the centrifugal force of said weights acting on the presser plate 92 overcome the influence of the springs 93a and automatically actuate the presser plate to move rearwardly effecting positive clutching of the driving and driven disks 20 and 21 with each other and between the presser plate 92 and bottom of the bell 19.

To render the weights 96 inoperative in response to speed, lips 99 are formed on the forward ends of these weights to be encompassed by the rim 100 formed by the recess 101 in the flanged side of the groove 84 of the gear 81, affording that the output centrifugal clutch will be rendered inoperative when the gear 81 is meshed with the reverse idler gear 76.

A tunnel 102 is formed in the case 15 accommodating a bearing 103 therein. The intermediate shaft 12 is journaled in the bearing 103 in a manner preventing axial movement of this shaft in either direction through the use of pin 104 fitted into both the shaft 12 and the intermediate gear 80, the latter having a reduced hub portion occupying the bearing 103.

Preferably the case 15 is formed with top and bottom openings 107 and 108 respectively covered by cover and bottom plates 109 and 110.

Referring to Figures 1, 2 and 3 the operation of the transmission under control of the input and output centrifugal automatic clutches in automatically initially completing the driving connections to initially move the vehicle from a state of rest in a reduced gear and in automatically changing the drive speed upon the vehicle attaining a predetermined speed is as follows:

Assuming the various parts to be in their respective positions, as shown in Figures 1, 2 and 3, the vehicle to be at a standstill and the engine operating at idling speed, the latter will be operating free from the transmission due to the neutral states of both presser plates 35 and 38 of the input clutch component A. Desiring to start the vehicle, with reasonable initial getaway and under conditions of not too steep a gradient, the driver simply depresses the engine accelerator pedal (not shown). Whereupon the engine speed is raised to a predetermined point whereof the centrifugal force of the weights 45 of the input clutch component A overcomes the balanced forces of the springs 41 and 42. The consequent result is that the presser plate 38 is flexibly urged forwardly causing the gradual clutching of the driven plate 13. It follows that the engine picks up the load automatically in intermediate (second) gear ratio between the clutch plate 13 and the vehicle propelling shaft 18 through the consecutive transmission intermediaries shaft 12 to gear 80, gear 80 to gear 74, gear 74 to gear 75 through the countershaft 72, gear 75 to gear 81 and gear 81 to the vehicle propelling shaft 18 through the medium of the one-way drive locking of the roller clutch members 25 between the cams 83 on the hub 82 of gear 81 and the bell 24, which latter is in rotation connection with the shaft 18. The driver maintaining engine acceleration and upon the vehicle attaining a predetermined speed of approximately 12 M. P. H., the centrifugal force of the weights 96 of the output clutch component C of the invention will overcome the tension of the springs 93a. The result being rearward urging of the presser plate 92 with consequent gradual clutching of the driven and driving disks 20 and 21 from initial engagement at 12 M. P. H. to positive engagement on the vehicle attaining an approximate speed of 15 M. P. H. Engagement of the disks 20 and 21 obviously directly connect the shafts 12 and 18 causing the bell 24 to overrun the initial intermediate speed driving gear 81, changing the transmission from intermediate gear drive to direct drive (high). The vehicle thusly is accelerated, solely by depressing the accelerator pedal, from a dead stop to 15 M. P. H. in intermediate reduced speed driving ratio and thereafter in high gear.

Assuming again that the vehicle is at a standstill, the engine to be idling and the various parts of the transmission to be in the identical respective positions as previously described in connection with accelerating the vehicle solely by depressing the accelerator pedal and as shown in Fig. 1. Desiring to start the vehicle with faster initial getaway, or under conditions of an unusually steep gradient, the driver depresses the single transmission forward speed change control treadle 62 with the left foot and simultaneously depresses the engine accelerator pedal (not shown) conventionally with the right foot. Whereupon, the yoke 55 is actuated whereby the rollers 56 thereof engage the hub end 57 of the optional presser plate 35 with the result that the latter is urged into engagement with the back plate 36. Rotation transmission is thusly initially effected from the engine flywheel 11 to the reduced speed effecting input shaft 30 through the medium of the optional presser plate 35 and the instrumentalities consisting of the nut and screw members 52 and 51. Rotation of the nut and screw 52 and 51 relative to each other results in moving the presser plate 35 in one direction and the shaft 30 in an opposite direction. This results in the plate 34 being clutched. It will be obvious that the power forces acting oppositely against the back plate 36 will advantageously cancel out therein. The presser plate 38 being thusly power constrained from responding to the urge of the centrifugal weights 45, the input clutch component A will act singularly to couple the reduced speed effecting shaft 30 to the engine flywheel 11 as long as the treadle 62 is maintained in a depressed state by the driver. In consequence, from a standing start, the transmission will initially give a double reduction (low speed) drive of the propeller shaft 18 from the shaft 30 thereto through gears 79 and 73, the countershaft 72, through gears 75 and 81 and the roller clutch members 25 to the bell 24; and the centrifugal automatic engagement of the disks 20 and 21 on the vehicle attaining a speed of 15 M. P. H. direct coupling the shafts 12 and 18 together, resulting in an automatic change to intermediate (second) gear through the medium of the drive thus being changed between shafts 30 and 18 to the train consisting of gears 79 and 73, the countershaft 72, gears 74 and 80 and shaft 12, and the engaged clutch disks 20 and 21. It is obvious that the intermediate speed effected in this manner, independently of the one-way clutch 25, will be a positive drive bringing the engine under the range of being driven by momentum of the vehicle for a compression brake in gear, and that this reduced gear will be maintained to any vehicle speed attainment above 15 M. P. H. as long as the operator maintains the treadle 62 in the depressed state. Releasing the treadle 62 gradually at will, the driver permits the input clutch component A to gradually respond to the centrifugal weights 45 and to adjust itself to its normal automatic clutch relation, being that of the presser plate 38 freeing the reduced speed effecting driven plate 34 and alternatively engaging the high speed effecting driven clutch plate 13. Whereupon, with complete release of the treadle 62, the optional presser plate 35 is also freed from the back plate 36. The resultant of this automatic permitted readjustment is a direct drive between the engine flywheel 11 and shaft 18 through clutch plate 13, shaft 12 and the engaged disks 20 and 25.

It will be obvious that the driver may make use of the treadle 62 at any speed of the vehicle above 15 M. P. H. to optionally change from high to second gear, which above the 12–15 M. P. H. speed range affords the use of the engine in compression as a brake; and below 15 M. P. H. to optionally change from the normally automatically adjusted second gear to first (low) gear.

To establish the transmission in an absolutely neutral state the gear 81 is shifted by moving the hand control 117 to an intermediate position, whereupon the gear 81 is shifted by means of a wire 118, crank 116, shaft 87 and crank 86 to a neutral position between the gears 75 and 78. Similarly, to establish the transmission in reverse, the hand control 117 is pressed fully forward, resulting in the gear 81 being shifted into mesh with the gear 78. Since the shift to reverse would only be undertaken when the vehicle is at a dead stop, under which condition the centrifugal weights 96 of the output clutch component C are at rest whereupon the lips 99 thereof occupy a contracted circle line, shifting of the gear 81 into reverse will simultaneously bring the rim 100 of this gear into encompassing relation with the lips 99 of all the weights 96, thus preventing these weights responding to speed of rotation of the shaft 18 while the latter is being driven in reverse gear. Similarly shifting of the gear 81 into reverse brings the jaws 88 thereon into engagement with the jaws 89, thus effecting a reverse drive lock between the gear 81 and the shaft 18.

Referring to the modified change speed gearing component shown in Fig. 4, which is more particularly adapted for use exclusively with the input clutch component A, and proposed in connection with the latter to provide a transmission wherein manual shifting of some of the forward speeds is retained, the low forward and reverse drive pinions 75' and 76' are positioned reversely to their arrangement shown in Fig. 1. Accordingly the gear 81' is adapted to shift forwardly into mesh with the reverse idler gear 78'. A separate low forward speed driven gear 111 mates in constant mesh with the pinion 75'. The gear 81' is splined at 113–114 to rotate with the shaft 18' and thereon is shiftable rearwardly into spline clutch engagement with clutch teeth 112 provided on the gear 111 to establish the low forward speed drive. The gear 111 is loose on the shaft 18'. Also, clutch teeth 115 are provided on the intermediate shaft 12' for spline clutch engagement by the gear 81'. The splines 114 in the bore of the gear 81' are divided into opposite end series providing a neutral zone relative to clutch teeth 115 while the gear 81' is in mesh with the reverse gear 78'. Assuming the gear 81' to be in clutch engagement at 112–114 with the gear 111, use of the treadle control 62 will result in the power transmitting from the flywheel 11 through driven clutch plates 34 and 35 to shaft 30', thence through gears 79' and 73' to the countershaft 72', and gears 75' and 111 to shaft 18' through the clutch connection therebetween of the gear 81'. The resulting drive is first gear ratio. In the same gearing relation, the normal centrifugal automatic action of the input clutch component A will be to effect the drive through the shaft 12', thence through gears 80' and 74', countershaft 72', gears 75' and 111 and to the shaft 18' by means of the clutch relation of the gear 81' with the gear 111. The resulting drive is second speed gear ratio. The gearing manually established in the alternative forward speed range by clutch engagement of the gear 81' with the shaft 12' at 113–115 affords, with use of the treadle 62, a second speed driving ratio through the driven clutch plates 34 and 35, gears 79' and 73', countershaft 72', and gears 74' and 80', while the normal centrifugal automatic action of the input clutch component A will be to effect a direct drive (high) between the flywheel 11 and the shaft 18' through the driven plate 13 and shaft 12'.

In connection with either form of change speed gearing component shown, it will be understood that any number of variable speed effecting gears may be employed without departing from the spirit of the invention. Also in connection with the component D, it will be understood that other forms of suitable instrumentalities for accomplishing similar results, namely, disengagement of the automatic effectually engaged input clutch in sequence to engagement of the optionally engageable input clutch, may be substituted for the screw and nut forms 51 and 52, without departing from the spirit of the invention.

Thus it will be seen that I have provided a simple, rugged, highly mechanically efficient, easily and inexpensively manufacturable, easily assembled and disassembled and repaired and adjusted unitary assembly providing an automatic change speed transmitting system which is especially advantageous for use in connection with a motor vehicle, and by virtue of simplicity and corresponding low cost particularly provides an automatic change speed transmission importuned of the art for use in vehicles in the lower priced brackets; a system singularly enabling sustained torque transmission between the prime mover and the vehicle wheels without interruption under sustained full throttle acceleration, if desired, while three variable ratio speeds are brought into use, one succeeding the other automatically and entirely by frictional engagement, giving lightening vehicle acceleration; and a system singularly affording an engine brake or acceleration utility gear drive alternative to high at any vehicle speed automatically under driver option.

The invention has been described in considerable detail and as applied to a motor vehicle in connection with which it has special utility, but it is to be understood that, broadly speaking, the invention is capable of various adaptations and that the specific structure may be varied within wide limits without departing from the spirit of the invention as defined in the accompanying claims.

I claim:

1. In a power transmitting mechanism, axially aligned driving and driven shafts, two parallel out of line and longitudinally spaced gears, one for a given direction drive and the other for a reverse direction drive, means for driving said two gears from said driving shaft in opposite directions, a selector gear in encircling and rotatable and axially movable relative relation to said driving shaft, a device actuated by said selector gear and operating to drive said driven shaft in one direction and permitting overrun of said driven shaft in the same direction, said selector gear being movable in one direction into mesh with one of said two out-of-line gears and in the other direction into mesh with the other of said two gears, and said selector gear and said driven shaft each having parts to be engaged simultaneously with the meshing of said selector gear with said reverse drive one of said two out-of-line gears for positively preventing relative rotation between said selector gear and driven shaft in either direction while said selector gear is operating in said reverse drive.

2. In a motor vehicle drive transmission mechanism, a member driven by the vehicle engine, a vehicle propelling member, a variable driving ratio gearing between said engine driven and vehicle propelling members, means including a clutch for connecting said gearing to said engine driven member, a main shaft of said gearing in end to end relation with said vehicle propelling member, means in said gearing provided with a one-way clutch for driving said vehicle propelling member at reduced speed relative to said main shaft in one direction and permitting overrun of said vehicle propelling member in the same direction, a bottom friction clutch plate carried in rotation with one of said main shaft and vehicle propelling members, a presser clutch plate carried in rotation with said bottom plate, a plurality of driving clutch disks carried in rotation with said presser plate, a plurality of mating clutch disks carried in rotation with the other of said main shaft and vehicle propelling members, the mating disks alternating and disposed between said presser and bottom plates, said presser plate being movable to clutch or declutch said mating disks together between itself and said bottom plate, means for automatically and yieldingly moving said presser plate in one direction to declutch said disks, and means responsive to the speed of the one of said main shaft and vehicle propelling members with which said presser and bottom plates are rotatable for moving said presser plate in the other direction to clutch said mating disks together.

3. In a power transmission, two axially aligned power transmitting members one being a driving member and the other being a driven member, a centrifugal clutch fixed to said driven member and adapted on sufficient speed of rotation to cause operative connection between said two members, a forward gear drive for driving said driven member, a reverse gear drive for driving said driven member, means including a member shiftable in one direction to effect completion of the driving connections of said forward gear drive to drive said driven member and shiftable in the other direction to effect completion of the driving connections of said reverse gear drive to drive said driven member, and means for rendering said clutch centrifugally non-speed responsive in engagement effectuating tendencies when said shiftable member occupies a position effective in completing said driving connections of said reverse drive.

4. In a transmission mechanism, and in combination axially aligned driving, driven and intermediate members, a speed reducing train of power transmitting members driven by said intermediate member and operating to drive said driven member, means for directly connecting said driving and intermediate members including a first frictionally-engaging element and means operable in accordance with the speed of said driving member to cause engagement of said first element, means for directly connecting said intermediate and driven members including a second frictionally-engaging element and means operable in accordance with the speed of one of said intermediate and driven members to cause engagement of said second element, a second speed reducing train of power transmitting members operating to drive said intermediate member and independently connectible with said driving member, means for connecting said second speed reducing train to said driving member including a third frictionally-engaging element, and means for effecting engagement of said third element.

5. In a power transmitting mechanism and in combination, driving, driven and intermediate power transmitting members rotatably mounted in axial alignment; transmitting means giving one driving ratio operating connection between said intermediate and driven members, said one ratio means including a device rendering said connection operative to drive said driven member and permit said driven member being driven from said intermediate member at a faster speed while maintaining said one driving ratio connection; means for operatively connecting said driven member to be driven from said intermediate member at said faster speed automatically upon said driven member attaining a predetermined speed of rotation, said faster connecting means including a centrifugal automatic engaging clutch carried in rotation with said driven member and adapted on sufficient speed of rotation to cause said faster operating connection; and primary drive connection establishing means for automatically connecting said intermediate member to be driven from said driving member upon said driving member attaining a sufficient speed of rotation, said primary connecting means including a speed reactive automatic clutch between, and adapted operatively to effect rotation transmission from, said driving member to said intermediate member reactively to speed of rotation of said driving member above a predetermined point and adapted to free said intermediate member rotatively from said driving member below said predetermined speed of the latter.

6. A motor vehicle change speed transmission comprising a driving member driven by the vehicle engine, a driven member for propelling said vehicle, a variable speed gearset between said driving and driven members, said gearset having at least two different speed effective input members operatively in contiguity with said driving member and at least two different speed effected output members operatively in contiguity with said driven member, means including a device rendering the relatively slow speed one of said two output members operative to drive said driven member whereby an operative connection may be effected between the other and relatively faster one of said two output members and said driven member while maintaining the driving connection of said slow speed output member with said driven member, two input friction clutches one operatively between each of said gearset input members and said driving member, at least one of said clutches being a centrifugal clutch fixed to said driving member and adapted on sufficient speed of rotation to cause operative connection between said driving member and the respective clutch associate one of said gearset input members, the other of said two input clutches having its driving element connected to turn with said driving member and its driven element connected to turn with its respective associate one of said gearset input members, means for optionally controlling said other of said input clutches to cause operative connection between its associate one of said gearset input members and said driving member, supplemental control means intercontrol connecting said two input clutches whereby said one clutch will be caused to disestablish operative connection between its associate one of said two gearset input members and said driving member while said other clutch is optionally controlled to cause its respective associate member operating connection, and another centrifugal clutch fixed to said driven member and adapted on sufficient speed of rotation to cause operative connection between the said faster one of said gearset output members and said driven member.

7. A change speed motor vehicle transmission comprising axially aligned driving, driven and intermediate shafts and a countershaft parallel to said intermediate shaft, a final gearing driven member loosely encircling the driven shaft contiguous end of said intermediate shaft, a primary gearing driving member loosely encircling the primary driving shaft contiguous end of said intermediate shaft, one gear train operatively connecting said primary gearing driving member and countershaft, a second gear train operatively connecting said countershaft and intermediate shaft, a selective gearset for operatively connecting said countershaft to drive said final gearing driven member in either a forward drive effecting or a reverse drive effecting direction, means including a one-way clutch rendering the power transmitting train when consisting of said forward drive effective selection of said selective gearset operative to drive said driven shaft in said direction and permit overrun of said driven shaft in the same direction, means for rendering the power transmitting train when consisting of said reverse drive effective selection of said selective gearset operative to drive said driven shaft in said reverse direction, a first centrifugal clutch fixed to said driving shaft and adapted on sufficient speed of rotation to cause operative connection between said driving and intermediate shafts, a second centrifugal clutch fixed to said driven shaft and adapted on sufficient speed of rotation to cause operative connection between said intermediate and driven shafts, a fourth clutch being a friction clutch with one clutching element connected to turn with said driving shaft and its other clutching element connected to turn with said primary gearing driving member, means for effecting engagement of said fourth clutch directly in response to an act of the operator, and interclutch control means between said first centrifugal and said fourth clutches for effecting disengagement of said first centrifugal clutch when said fourth clutch is effectuated to engage directly by an act of the operator.

8. In a power transmitting mechanism, the combination of axially aligned drive, driven and intermediate shafts, a first friction clutch part to turn with said drive shaft, a second friction clutch part to turn with said intermediate shaft, means for engaging said first and second clutch parts, a third friction clutch part to turn with said intermediate shaft, a fourth friction clutch part to turn with said driven shaft, and means for engaging said third and fourth clutch parts, respectively, in response to predetermined speeds of rotation attainment by said drive and driven shaft members, and transmitting means including a one-way clutch mechanism forming a reduced speed one-way drive from said intermediate to said driven member up to said predetermined speed of rotation attainment and allowing for the direct drive operating connection between said intermediate and driven members being superimposed by the speed responsive effectuated engagement of said third and fourth clutch parts while maintaining the driving connections of said reduced speed transmitting means between said intermediate and driven members.

9. In a transmission mechanism, the combination of a direct drive shaft structure comprising a driving member, an axially aligned driven member and an axially aligned intermediate direct drive transmitting shaft element between said driving and driven members, first indirect driving transmitting means for driving said intermediate direct drive shaft element from said driving member at a different speed than said driving member including an optionally engageable unit of frictionally engageable elements for completing the driving connections of said first indirect drive transmitting means between said driving and intermediate direct drive shaft elements, second indirect drive transmitting means for driving said driven member from either said first indirect drive transmitting means or from said intermediate direct drive shaft element at a different speed than either the said driving member or said intermediate direct drive shaft element, said first and second indirect drive transmitting means jointly including a single counteraligned gear cluster and said second indirect drive transmitting means including an overrunning clutch means rendering said second indirect transmitting means operable to drive said driven member but allowing for a direct drive connection between said intermediate and driven direct drive shaft elements, means responsive to the speed of said driving member for directly connecting said driving and intermediate direct drive shaft elements, means responsive to the speed of said driven member for directly connecting said intermediate and driven direct drive shaft elements, means for engaging said optionally engageable unit of frictionally engageable elements, and means intercontrol connecting said driving member speed responsive means and said optionally engageable unit of frictionally engageable elements whereby said driving member speed responsive driving connection completing means is rendered inoperative while said optionally engageable unit of frictionally engageable elements are engager to cause a driving connection between said first indirect drive transmitting means and said driving member.

10. In a change speed transmission, the combination of axially aligned drive, driven and intermediate main transmission shafts, means for connecting said driven shaft to be rotated from said intermediate aligned shaft at one driving speed ratio including a centrifugal clutch fixed to said driven shaft and adapted on a sufficient speed of rotation attainment to complete the driving connections of said one driving speed ratio between said intermediate and driven shafts, means for rotating said driven shaft from said intermediate shaft in one direction and at a relatively slower driving speed ratio until the relatively higher driving speed ratio between said intermediate and driven shafts is effected by said centrifugal clutch including a one-way clutch for completing the driving connections of said relatively slow driving speed ratio means permanently to drive said driven shaft from said intermediate shaft in one direction but allowing for said relatively higher driving speed ratio means to be connected operative between said intermediate and driven shafts while maintaining the driving connections of said relatively slower driving speed ratio means therebetween, one of said different driving speed ratio means between said intermediate and driven shafts including a countershaft parallel to said intermediate shaft forming an intermediary transmitting element of said means, means for directly coupling said intermediate aligned shaft to said drive shaft including an automatic engaging clutch mechanism, two-way drive transmitting means for optionally rotating said intermediate aligned shaft from said aligned drive shaft through the medium of said countershaft and at reduced speed to superimpose the speed ratio drive of said aligned driven shaft through either of said rotation transmitting means between said aligned intermediate and driven shafts with a primary speed reducing drive from said aligned drive shaft relatively under that which results from the said automatic engaging clutch direct coupling completion of the driving connections as effected between said aligned drive and intermediate shafts, said optional speed reducing transmitting means between said drive and intermediate aligned shafts including an optionally engageable clutch mechanism adapted to complete the driving connections of said means between said aligned drive and intermediate shafts, and means under control of the operator for substantially simultaneously rendering said drive-to-intermediate aligned shafts direct coupling automatic clutch mechanism inoperative and effecting engagement of said optionally engageable clutch mechanism.

11. A change speed transmission comprising, and in combination, axially aligned drive, driven and intermediate main transmission shafts and a parallel countershaft; transmitting means for rotating said driven shaft from said intermediate shaft through the medium of said countershaft at slow speed including a one-way clutch incorporated in said means between said countershaft and said driven shaft; means for directly coupling said main transmission drive shaft to said main transmission intermediate shaft including a centrifugal clutch fixed to said drive shaft and adapted on sufficient speed of rotation to automatically cause said direct coupling between said drive and intermediate shafts; means for directly coupling said main transmission intermediate shaft to said main transmission driven shaft including a centrifugal clutch fixed to said driven shaft and adapted on sufficient speed of rotation to cause said direct coupling between said intermediate and driven shafts; and means under control of the operator for optionally changing the driving speed ration between said main transmission drive and driven shafts, respectively, as established by either of said centrifugal clutch couplings, said optional change speed ratio means including transmitting means normally in connection to drive both the countershaft and said main transmission intermediate shaft at a different speed than, and connectible to be driven from, said main transmission drive shaft, an optionally engageable clutch for effecting said connection, and means under control of the operator for rendering said drive shaft-to-intermediate shaft direct coupling centrifugal clutch medium inoperative and for substantially simultaneously effecting engagement of said optionally engageable clutch.

12. In a power transmitting mechanism, the combination of axially aligned driving and intermediate shafts and a parallel countershaft; a first pair of constant meshing gears permanently connecting said intermediate and countershafts comprising a gear fixedly carried in rotation with said intermediate shaft and a constant meshing mating gear fixedly carried in rotation with said countershaft; a centrifugal automatic clutch mechanism carried in rotation with one of said driving and intermediate shafts and adapted upon sufficient speed of rotation to cause coupling of said shafts together whereby said countershaft becomes positively two-way drive indirectly connected at one-speed ratio with said driving member through said intermediate shaft and said first pair of constant meshing gears; means for optionally positive two-way drive indirectly connecting said driving and countershafts at another speed ratio comprising, a second constant meshing gear pair comprising a second gear fixedly carried rotatable with said countershaft and a constant meshing mating gear in encircling and rotatable relative relation to said intermediate shaft and for individual direct coupling to said driving shaft, and a solely optionally engageable friction clutch mechanism under control of the operator for coupling said intermediate shaft rotatable relative encircling gear to said driving shaft; and means inter-clutch control connecting said centrifugal automatic clutch mechanism and said solely optionally engageable clutch mechanism whereby said centrifugal automatic clutch mechanism is rendered inoperative while said optionally engageable clutch mechanism is engaged.

13. In a motor vehicle change speed power transmission which includes a driving member driven by the vehicle engine, an axially aligned transmitting shaft, a driven member for propelling said vehicle, a transmitting means train including an overrunning clutch for driving said driven member from said transmitting shaft at a low speed ratio and means including another clutch provided with automatic means for engaging same for connecting said driven member to be driven from said transmitting shaft at a higher speed ratio; of means for two-way drive connecting said transmitting shaft to said engine driven driving member whereby said engine driven driving member will turn faster than said transmitting shaft, said last-mentioned means including a countershaft parallel to said transmitting shaft, a gear member adapted to be coupled to turn with said engine driven driving member, positive two-way driving gearing connecting said gear member and said transmitting shaft through the medium of said countershaft and means including a friction clutch mechanism for coupling said gear member to said engine driven driving member.

14. In a power transmitting mechanism which includes driving and driven member; means for automatically connecting said members initially at a slow speed ratio of drive including a main transmission shaft in axial alignment, and connectible to turn with, said driving member, a centrifugal automatic clutch mechanism carried in rotation with said driving member and adapted upon sufficient speed of rotation to cause said connection and a low speed transmitting means driven by said main transmission shaft and operating to drive said driven member; automatic means for connecting said driving and driven members at a faster speed ratio including an automatic drive coupling unit of transmitting means driven by said main transmission shaft and operative to take the load of said driven member from said slow speed transmitting means; and means for optionally changing the speed ratio of drive between said driving and driven members including a fixed axis countershaft parallel to said main transmission shaft, a first pair of constant meshing gears permanently two-way drive connecting said countershaft and main transmission shaft for rotation transmission in either direction therebetween, a second pair of constant meshing gears one of which is permanently in connection to rotate in either direction with said countershaft and the other of which is in encircling and rotatable relative relation to said main transmission shaft and for optional coupling to turn with said driving member, a solely optionally engageable friction clutch mechanism for causing said coupling of said gear to said driving member, and means operative solely at the will of the operator for substantially simultaneously causing engagement of said solely optionally engageable clutch mechanism and disengagement of said driving member-carried centrifugal automatic clutch mechanism.

15. In a motor vehicle drive which includes axially aligned driving and driven transmitting members, a change speed transmission therebetween having, a first speed ratio automatically establishable drive comprising an intermediate shaft between and in axial alignment with said driving and driven members and means including a first centrifugal automatic clutch carried in rotation with said driving member and adapted upon sufficient speed of rotation to couple said intermediate shaft and driving member together and means including gearing having an overrunning clutch in series therein giving one speed ratio of drive between said intermediate shaft and driven member, a second automatically establishable drive including faster speed transmitting means driven from said intermediate shaft and a second centrifugal automatic clutch mechanism carried in rotation with said driven member and adapted upon sufficient speed of rotation to complete the driving connections of said faster transmitting means between said intermediate shaft and driven member, and an optional speed ratio of drive including a countershaft parallel to said intermediate shaft and transmitting means of which said countershaft is contributory for indirect driving of said intermediate shaft from said driving member and a solely optionally engageable clutch mechanism under control of the operator for completing the driving connections of said optional speed ratio of drive between said intermediate shaft and driving member, and means intercontrol relating said driving member-to-intermediate shaft centrifugal automatic clutch and said optional speed ratio of drive clutch mechanism whereby said centrifugal clutch is rendered inoperative while said optional clutch is engaged.

16. In a power transmitting mechanism, axially aligned driving, driven and main intermediate shafts, multi-units of frictionally-engaging elements for coupling said driving, driven and intermediate shafts to rotate as a unit including a frictionally-engaging element rotatable with said driving shaft and a mating frictionally-engaging element rotatable with said intermediate shaft and a frictionally engaging element rotatable with said driven shaft and a mating frictionally-engaging element rotatable with said intermediate shaft, transmitting means including an overrunning clutch in series in said means forming means to drive said driven shaft at reduced speed from said intermediate shaft in one direction, and transmitting means for driving said intermediate shaft at reduced speed from said driving shaft including an auxiliary intermediate shaft in encircling and rotatable relative relation to said main intermediate shaft and means for coupling said auxiliary intermediate shaft to said driving shaft comprising another unit of frictionally-engaging elements one element of which is rotatable with said auxiliary intermediate shaft and a mating element of which is rotatable with said driving shaft.

17. In a motor vehicle drive, a combined engine driven power transmitting driving member and vehicle propelling power transmitting driven member speed responsive automatic transmission for initial drive coupling to start the vehicle upon said driving member attaining a predetermined speed of rotation and for changing the speed ratio of drive upon said driven member attaining a predetermined speed of rotation, comprising in combination, driving and driven members, respectively, driven by the vehicle engine and for propelling said vehicle, a variable speed gearset between said driving and driven members having an intermediate transmitting shaft element in axial alignment with and between said driving and driven members and a parallel countershaft, gearing two-way drive connecting said intermediate and countershafts, selective means for effecting either a forward or a reverse driving train between said countershaft and driven member, an overrunning clutch in series with the forward drive train of said selective means permitting said driven member rotating at higher speed while said forward drive selective train remains mobilized to take the load of said driven member, means for automatically connecting said intermediate shaft to be driven from said driving member upon said driving member attaining a predetermined speed of rotation including a first engaging speed responsive automatic clutch mechanism responsive to the speed of said driving member, and means for automatically connecting said driven member to be driven from said intermediate shaft at a higher speed ratio upon said driven member attaining a predetermined speed of rotation including a secondly engaging speed responsive automatic clutch mechanism responsive to the speed of said driven member.

18. In a power transmitting mechanism which includes driving and driven members; intermediary multi-speed transmitting mechanism between said driving and driven members, said intermediary multi-speed transmitting mechanism having a countershaft parallel to said driving member, a plurality of concentric power transmitting members in axial alignment with, and each for individual connection to, said driving member, positive constant meshing two-way drive gearing permanently connecting each of said plurality of concentric members to drive said countershaft and said countershaft to drive each of the respective concentric members and each of said concentric members to drive each other of said concentric members through the medium of said countershaft in either direction, and a transmitting train between said countershaft and said driven member including an overrunning clutch in series in said train rendering said train a one-way driving medium between said countershaft and said driven member and permitting faster rotation of said driven member while said train remains mobilized to take the load of said driven member; means for positively two-way drive connecting at least one of said plurality of concentric members to said driven member forming means for rotating said driven member at said faster speed; and means for positively two-way drive connecting each of said plurality of concentric members individually to said driving member.

19. In a change speed power transmitting mechanism which includes axially aligned driving and driven members and an intermediate shaft, the combination with means for driving said driven member from said intermediate shaft at a low speed ratio and at a high speed ratio selectively automatic in accordance with the speed of rotation of said driven member comprising, a low speed ratio of drive transmitting means for driving said driven member from said intermediate shaft in one direction and having an overrunning clutch in series in said transmitting means therebetween whereby faster rotation of said driven member is permitted than the ratio of drive by said low speed transmitting means while said low speed transmitting means remains mobilized to take the load of said driven member, and a high speed ratio of drive transmitting means between said intermediate shaft and driven member and means operating in accordance with the speed of said driven member for completing the driving connections of said high speed ratio of drive transmitting means between said intermediate shaft and driven members; of means operating in accordance with the speed of said driving member for direct coupling said driving member and said intermediate shaft together; and means solely operable at the option of the operator for supplanting the direct drive coupling of said driving member and intermediate shaft with a speed reducing gear drive connection therebetween whereby the normal speed ratios of any prevailing driving connection between said intermediate shaft and driven member is drive augmentively sub-reduced in driving speed effectiveness to drive said driven member, said optional speed reducing augmentive drive means including a positive two-way drive gear train permanently in operating connection with said intermediate shaft and for optional connection to said driving member, a normally disengaged friction clutch mechanism between, and solely optionally engageable to connect, said positive two-way drive gear train to said driving member, means under control of the operator for effecting engagement of said optionally engageable friction clutch mechanism, and means inter-control relating the driving member-to-gear drive train connecting clutch mechanism and the driving member-to-intermediate shaft direct coupling means whereby the latter is rendered inoperative while said gear train connecting clutch is engaged.

20. In a change speed power transmission, in combination, with driving and driven members and a multi-speed transmitting mechanism having a main driving shaft element directly connectible to said driving member and having multi-speed ratios of drive transmitting trains commonly driven from said main shaft element and for driving said driven member at different speed ratios with respect to the speed of said main driving shaft element; of a two-speed drive coupling means for connecting said main shaft element to be driven from, or to drive, said driving member, respectively, in either direction comprising, a direct drive connecting automatic engaging clutch mechanism between and operating to directly couple said driving member and said main shaft element to rotate together, a positive two-way drive gear train permanently in two-way drive rotation transmitting connection with said main shaft element but normally disconnected and solely optionally connectible to be driven from, or to drive, said driving member, and means under control of the operator for rendering said direct drive connecting automatic engaging clutch inoperative and alternatively but substantially simultaneously cause positive two-way drive completion of the driving connections of said positive two-way drive gear train between said driving member and said main shaft element, said last-mentioned means including a normally disengaged and solely optionally engageable unit of frictionally-engaging elements for completing the driving connections of said gear train between said main shaft element and said driving member and means intercontrol connecting said direct drive connecting automatic engaging clutch and said gear drive connecting unit of frictionally-engaging elements for causing said direct drive connecting automatic clutch to be rendered inoperative and prevented from engaging while said unit of frictionally-engaging elements are operating to connect said gear train.

21. In a motor vehicle drive which includes a driving member driven by the vehicle engine and a driven member for propelling said vehicle and a multi-speed transmitting mechanism drivingly automatically relatable to drive said driven member at different speed ratios and a shaft power input member to the multi-speed transmitting mechanism for direct drive connection to the engine driven driving member; in combination, automatic drive coupling means operating in accordance with the speed of the engine driven driving member to cause connection of the shaft power input member of the multi-speed transmitting unit to the engine driven driving member; an auxiliary gear drive input train to said multi-speed transmitting member permanently in connection to drive said multi-speed transmitting mechanism but solely optionally connectible to be driven from said engine driven driving member and a normally disengaged and solely optionally engageable friction clutch mechanism for connecting said auxiliary gear drive input train to said engine driven driving member; means under control of the operator for causing engagement of said optionally engageable clutch mechanism; and optional control means of said automatic drive coupling means inter-related with said optionally engageable clutch mechanism and through the medium of which latter said automatic drive coupling means optional control means is subrelated with said operator controlled means for causing said automatic drive coupling means to be rendered inoperative while said optionally engageable clutch mechanism is engaged.

22. In a power transmitting mechanism which includes axially aligned driving and driven members and a parallel countershaft having a fixed axis; the combination of a selective one-way driving forward and reverse drive gearset between said countershaft and said driven member including an overrunning clutch in series in the forward driving establishable train of said gearset between said countershaft and driven member for facilitating said driven member to rotate faster in the forward drive direction than the speed ratio of drive of the selected forward drive train of said gearset while said train remains mobilized to take the load of said driven member; and a friction clutch means selectable multi-speed gearset between said driving member and countershaft comprising a plurality of concentric and rotatable relative transmitting shafts in axial alignment with, and each for individual friction clutch direct coupling to, said driving member, a separate gear train connecting each of said plurality of concentric transmitting shafts to said countershaft, respectively, at a different speed ratio of drive, and multi-clutch means including a separate engaging unit of frictionally-engaging elements for coupling each of said plurality of concentric transmitting shafts to said driving member.

23. In a motor vehicle drive which includes a driving member driven by the vehicle engine and an axially aligned driven member for propelling said vehicle and an axially aligned intermediate shaft between said driving and driven members; the combination of driving and driven member speed responsive automatic clutch mechanisms, respectively, for coupling said axially aligned driving member and intermediate shaft together and for coupling said axially aligned intermediate shaft and said driven member together; and means for optionally cancelling the coupling between said driving member and axially aligned said intermediate shaft as established by said driving member speed responsive automatic clutch mechanism and substituting therebetween a positive two-way drive indirect driving connection whereby either the said intermediate shaft may be driven from said driving member in either direction under power at a different speed than said driving member or said driving member may be driven from said intermediate shaft under load momentum in either direction at a different speed than said intermediate shaft, said optional means including a positive two-way drive gearing forming a transmitting train permanently in operating connection at one end with one of said driving member and intermediate shaft members, an optionally engageable friction clutch mechanism for connecting said transmitting train at its other end to the other of said driving member and intermediate shaft members, and means for substantially simultaneously causing engagement of said optionally engageable clutch mechanism and disengagement of the driving member speed responsive automatic clutch.

EVERETT R. BURTNETT.